United States Patent [19]

Dienst et al.

[11] Patent Number: 5,110,284
[45] Date of Patent: May 5, 1992

[54] WEAR-RESISTANT HOUSING FOR AN EXTRUSION DEVICE

[75] Inventors: Manfred Dienst, Burgdorf; Arnold Aschemann, Harsum, both of Fed. Rep. of Germany

[73] Assignee: Hermann Berstorff Maschinenbau GmbH, Hanover, Fed. Rep. of Germany

[21] Appl. No.: 628,004

[22] Filed: Dec. 17, 1990

[30] Foreign Application Priority Data

Dec. 21, 1989 [DE] Fed. Rep. of Germany ....... 3942350

[51] Int. Cl.⁵ .............................................. B29C 47/66
[52] U.S. Cl. ..................... 425/183; 366/83; 425/204
[58] Field of Search ............... 264/349; 366/79, 83, 366/84, 85; 425/183, 204, 205

[56] References Cited

U.S. PATENT DOCUMENTS

| | | | |
|---|---|---|---|
| 2,149,066 | 2/1939 | Orsini | 264/73 |
| 3,804,382 | 4/1974 | Pultz | 366/79 |
| 4,036,540 | 7/1977 | Seafert | 366/83 |
| 4,117,583 | 10/1978 | Gnädig et al. | 366/83 |
| 4,133,460 | 1/1979 | Jerpbak | 366/79 |
| 4,385,876 | 5/1983 | Scherping et al. | 366/85 |
| 4,415,268 | 11/1983 | Brinkmann et al. | 366/85 |
| 4,462,692 | 7/1984 | Meyer | 366/79 |
| 4,519,713 | 5/1985 | Godsey et al. | 366/79 |
| 4,640,672 | 2/1987 | Ellwood | 366/79 |
| 4,702,695 | 10/1987 | Blach | 366/83 |
| 4,746,220 | 5/1988 | Sukai et al. | 366/79 |

FOREIGN PATENT DOCUMENTS 2426732 6/1974 Fed. Rep. of Germany .

Primary Examiner—Richard L. Chiesa
Assistant Examiner—W. J. Matney, Jr.
Attorney, Agent, or Firm—Foley & Lardner

[57] ABSTRACT

A corrosion-resistant and wear resistant housing for a screw extruder having one or more axis-parallel bores, each of which accommodates a screw of the extruder. Support sleeves, which have a smaller internal diameter than the screw bore or bores and which guide the rotating screw or screws are disposed in the two end regions of the housing poritons, whereby the corrosion and wear caused by the material being extruded are primarily restricted to the support sleeves.

18 Claims, 3 Drawing Sheets

WEAR-RESISTANT HOUSING FOR AN EXTRUSION DEVICE

FIELD OF THE INVENTION

The present invention relates to a wear-resistant housing for an extrusion device. More particularly, the present invention relates to a wear-resistant housing for an extrusion device of the type in which at least one screw is mounted for rotation within a housing.

BACKGROUND OF THE INVENTION AND PRIOR ART DISCUSSION

A wear-resistant housing for a screw extrusion device is disclosed in German Patent Specification No. 24 26 732 (U.S. Pat. No. 4,036,540). In such prior specification, there is disclosed a hollow cylindrical housing within which at least one screw rotates. The internal surface of the housing has a plurality of recesses uniformly distributed around its periphery but spaced from one another. Wedge-shaped wear-resistant insert members are inserted into these recesses.

The milling of individual recesses in the internal wall of the housing is a precision operation and is time-consuming. Moreover, the precision production of the insert members to be fitted into the milled recesses is equally time-consuming. To produce the individual wear-resistant insert members sufficiently accurately to ensure that they are firmly retained in position, very expensive machine tools are required. The machine tools which are used must have a hardness which is greater than that of the wear-resistant parts and, in consequence, they are extremely cost-intensive.

OBJECTS OF THE INVENTION

The present invention seeks to provide a corrosion-resistant and wear-resistant housing for a screw extruder, which housing can be produced very economically and in a very simple manner, can be easily assembled, and parts thereof can be interchanged with minimal assembly work.

SUMMARY OF THE INVENTION

According to the present invention, there is provided a wear-resistant housing for a screw extruder, comprising a barrel having a longitudinal axis and an internal surface surrounding but spaced from said longitudinal axis to define at least one bore extending longitudinally through the barrel, said barrel further including opposed first and second end regions, a sleeve member disposed in each of said first and second end regions, each sleeve member having a longitudinal axis which, when the sleeve member is located in the end region, coincides with the longitudinal axis of the barrel and each sleeve member including an internal surface surrounding the longitudinal axis but spaced therefrom to define at least one bore through the sleeve members, the bores in the barrel member and sleeve members jointly defining means for receiving at least one screw of said extruder, wherein the said bores defined in the sleeve members each have a diameter smaller than the diameter of the bore defined in said barrel.

Preferably, the housing additionally includes at least one insert member disposed within said barrel intermediate said sleeve members, each insert member having a longitudinal axis and an internal surface surrounding but spaced from said axis, said internal surface defining at least one bore through said insert member, which has a diameter in excess of the said diameter of bore in each sleeve member, the bore in said insert member being aligned with the bore in each said sleeve member and defining therewith means for receiving the screw of extruder, wherein each said sleeve member is formed from a material having a higher wear-resistance and a higher corrosion-resistance than the material forming the insert member.

Advantageously, said barrel comprises an odd-numbered plurality of barrel portions each having a longitudinal axis and an internal surface surrounding but spaced from said longitudinal axis to define an internal bore, means interconnecting and aligning said barrel portions such that the longitudinal axes thereof are contiguous with one another to form a barrel having opposed first and second end portions, and wherein at least one further sleeve member, identical to the sleeve members inserted into each of said end regions, is inserted into every alternate barrel portion.

The provision of sleeves in at least each end region of the housing portions restricts the corrosion and wear primarily to the sleeves. This is because the sleeves have a slightly smaller diameter than that of the main bore in the barrel or than that of the wear-resistant inserts in the central barrel portion if these latter are provided. The corrosion in the barrels is, in theory, the same at all locations. However, since greater friction occurs on the sleeves as a result of the pressure of the abrasive material situated between the crests of the flights of the screw or screws and the internal wall of the barrel, the wear is more concentrated on the sleeves.

Accordingly, only the sleeves need to be replaced after a predetermined amount of wear has occurred. It is therefore no longer necessary to replace the entire wear-resistant insert member except on very rare occasions. The replacement of the sleeves can be effected in an extremely economical and simple manner. Moreover, a relatively short sleeve can be produced in an economical manner as well as being rapidly replaceable. The sleeves play a simple support role and, in preferred embodiments, are sufficiently thin to resemble a disc. The size of the sleeve is, of course, selected in dependence upon the nature of the material being processed, particularly its properties of causing wear and corrosion.

In an advantageous embodiment, the sleeves are produced from a metal which is extremely corrosion-resistant and has high wear-resistance properties. The wear-resistance properties should be higher than the wear-resistant properties of the material used for forming the surface of the main bore of the barrel or of the insert member if provided. As a result, the wear is almost exclusively restricted to the support sleeves.

In this connection, it should be noted that if the sleeves are formed from a highly corrosion-resistant and highly wear-resistant metal and the surface forming the main bore of the barrel or of the insert member, if provided, is formed from a more economical, but only slightly wear-resistant metal, savings of up to 90% of the costs can be achieved, compared with an arrangement in which the entire surface defining the bore for the screw is made from a highly corrosion-resistant and wear-resistant material.

The difference in diameter between sleeves and the main bore of the housing or of the insert member, if provided, is dependent on the properties of the material to be processed, in particular the abrasive properties of the filler ingredients incorporated in a plastics material, such as glass fibre particles.

If a longer sleeve service-life is desired, the amount by which the sleeves protrude towards the longitudinal axis of the barrel compared with the surface defining the bore in the main body of the barrel, that is to say, the difference in diameters, should be made greater.

The axial length of the sleeves is also dependent upon the plastics material to be processed. Thus, it is advisable, for example, when using highly wear-resistant bimetallic material, to give the sleeve an axial length of 2 D, where D is the diameter of the screw of the extruder, and a bore diameter which is 4 mm smaller than that of the main bore in the barrel. This is because only a very short service-life is achieved even with such a large sleeve surface area.

BRIEF DESCRIPTION OF THE DRAWINGS

Various embodiments of a wear-resistant housing in accordance with the present invention will be further described, by way of example, with reference to the accompanying drawings, in which.

DESCRIPTION OF PREFERRED EMBODIMENTS

Figure 1:
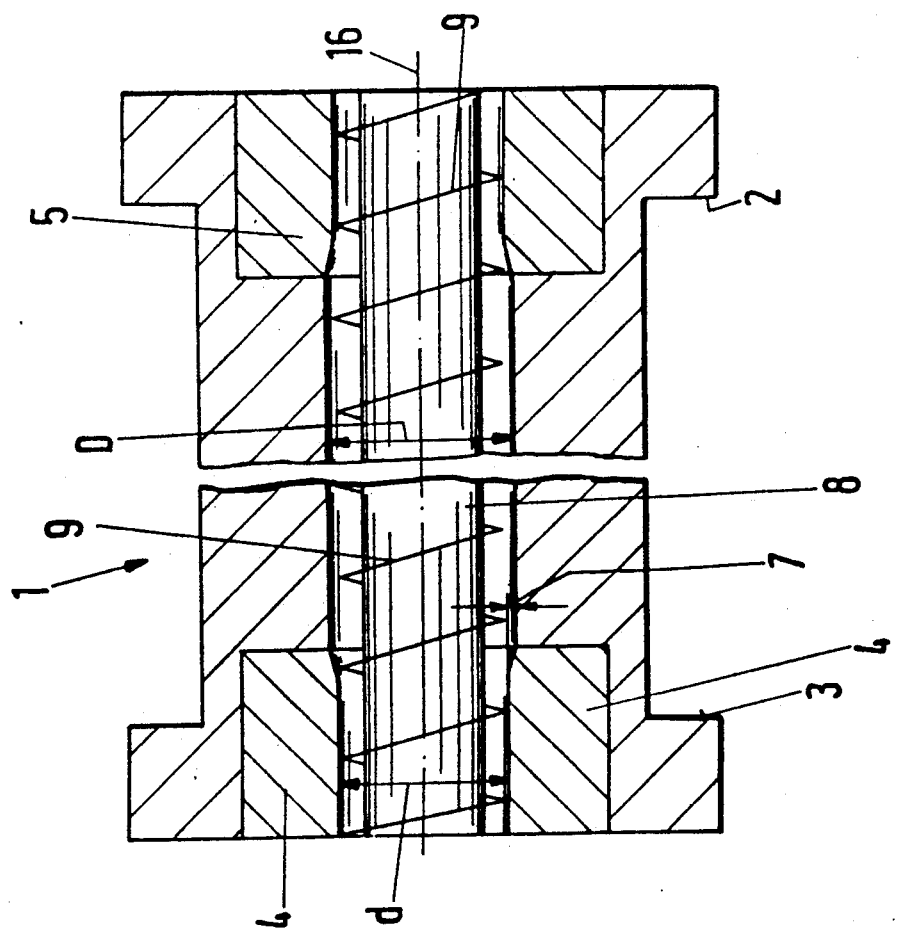
FIG. 1 is a longitudinal sectional view through a single-screw extruder having a housing in accordance with the present invention.

In FIG. 1, there is shown an extrusion device which includes a hollow housing portion or barrel 1 having a longitudinal axis 16. Flanges 2 and 3 are disposed at opposed ends of the housing 1, so that it can be flange-connected to further housing portions 1. Sleeves 4 and 5 are inserted into the ends of the housing. The sleeves 4 and 5 each have an internal diameter d which is smaller than the diameter D of the hollow interior of the major portion of the housing 1 and a longitudinal axis coincident with the axis 16 of the housing. The difference between the diameters d and D is denoted by the reference numeral 7.

Figure 3:
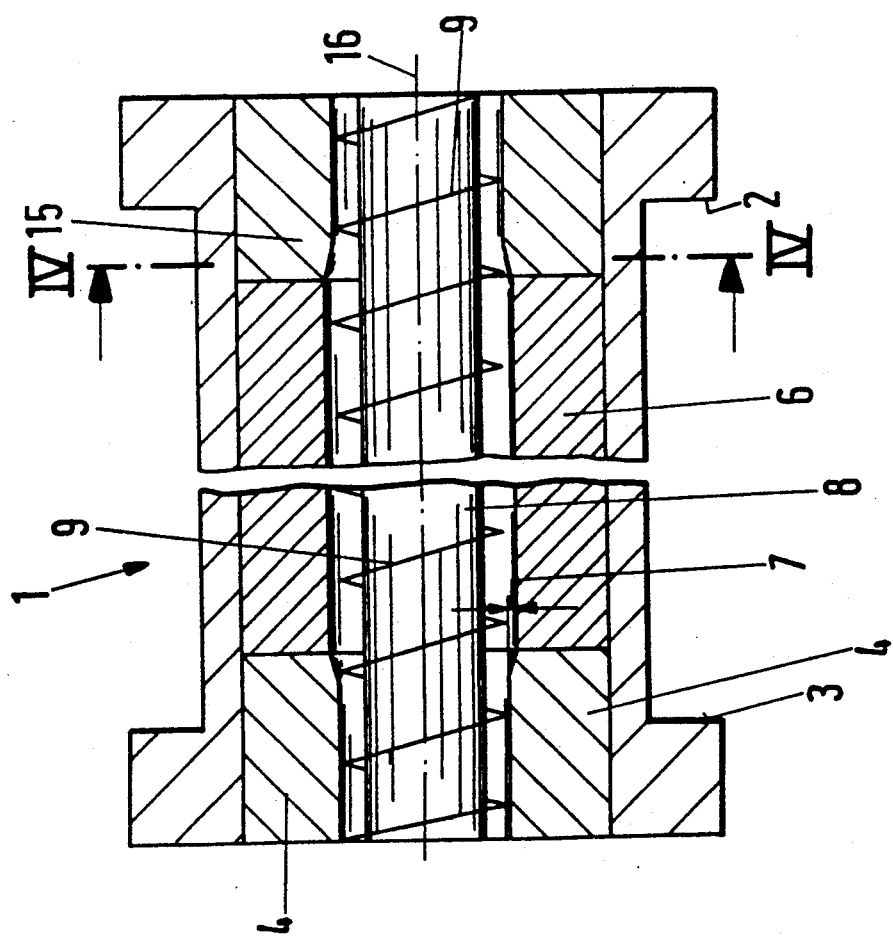
FIG. 3 is a cross-sectional view similar to FIG. 1 but in which the central region of the housing is provided with a wear-resistant insert member.

An extruder screw 8, which is schematically shown in FIGS. 1 and 3, is journalled for rotation within the hollow interior of the housing 1 and may be guided on the sleeves 4 and 5. If the screw is then rotated at a predetermined speed, self-centering occurs, with the result that the flights 9 of the screw 8 do not come into contact with the sleeves 4 and 5. However, corrosion and wear in the region of the sleeves 4 and 5 are greater. This is because the distance between the crests of the screw flights 9 and the sleeves 4 and 5 is smaller than in the main body of the housing and hence the pressure moving the material to be extruded forwardly is less. In the main body of the housing, where there are no sleeves, there is a greater spacing between ridges of the flights 9 and the internal wall of the barrel and the forwarding pressure is greater. The sleeves are replaced when the wear thereof exceeds a predetermined limit. The sleeves are formed from a metallic material or from a metal alloy which has a higher corrosion-resistance and wear resistance than the material from which the internal surface of the bore in the main body of the housing is formed. The difference in the diameters d and D is of the order of 0.05 mm to 5 mm, and in this embodiment is 1.5 mm. The axial length of the sleeves is selected in dependence upon the material being extruded but lies in the range of from 0.01 to 2 times the diameter of the screw. The sleeves may merely be pressed into the ends of the housing. If desired, however, they may be maintained in their desired position by using an adhesive or screw-threaded connectors. Alternatively, a form-fitting method of attachment, such as dovetail joints, may be utilised. The sleeves may also be formed from a bimetallic material or hardened chrome steel.

Figure 2:
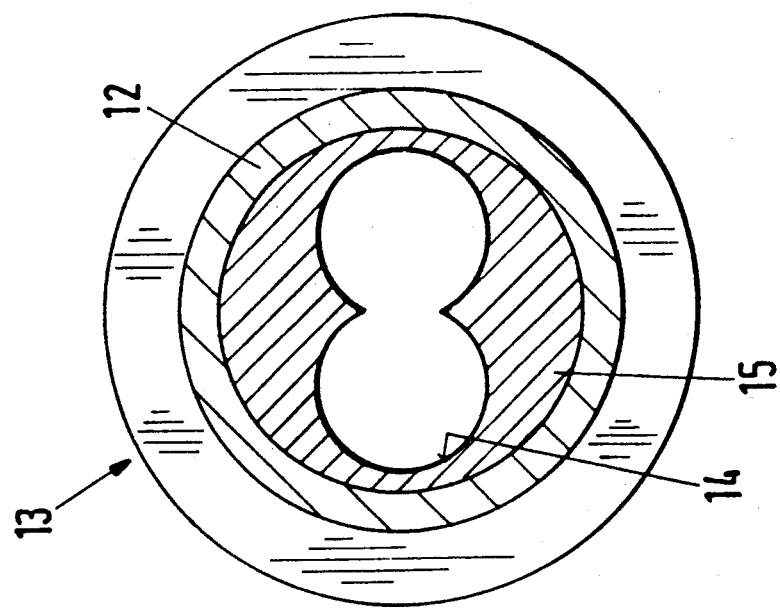
FIG. 2 is a cross-sectional view through a twin-screw extruder having a housing in accordance with the present invention, the housing including a support sleeve inserted into a wear-resistant insert member.

In FIG. 2, a modified embodiment is shown. In this arrangement, the extruder is a twin-screw extruder. Moreover, the sleeve members 15, only one of which is shown, are not inserted directly into the end portions of the main bore of the housing. Instead, a wear-resistant insert member 12 is located in the main bore of the housing, and the sleeves 15, again only one of which is shown, are inserted into the insert member 12. The sleeves 15 each define an internal bore 14 which has a figure 8 configuration to accommodate the two screws (not shown).

In FIG. 3, an arrangement similar to that described with reference to FIG. 1 is shown. However, in this embodiment a wear-resistant insert 6 is disposed in the main bore of the housing and extends between the sleeves 4 and 15.

Figure 4:
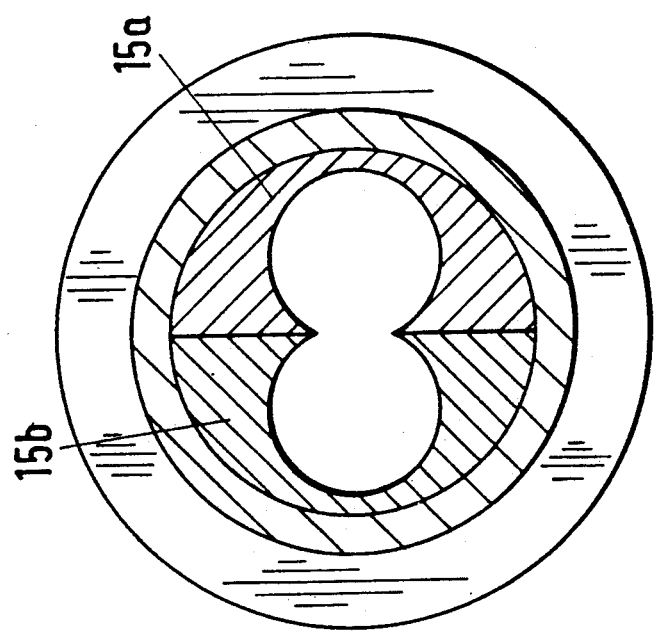
FIG. 4 is a cross-sectional view taken along the line IV—IV of FIG. 3.

In FIG. 4 an arrangement similar to that described with reference to FIG. 2 is shown. In the FIG. 4 embodiment, however, the sleeve 15 is formed from two portions 15a and 15b which are welded together along the plane of intersection of the bores for the two screws.

Figure 5:
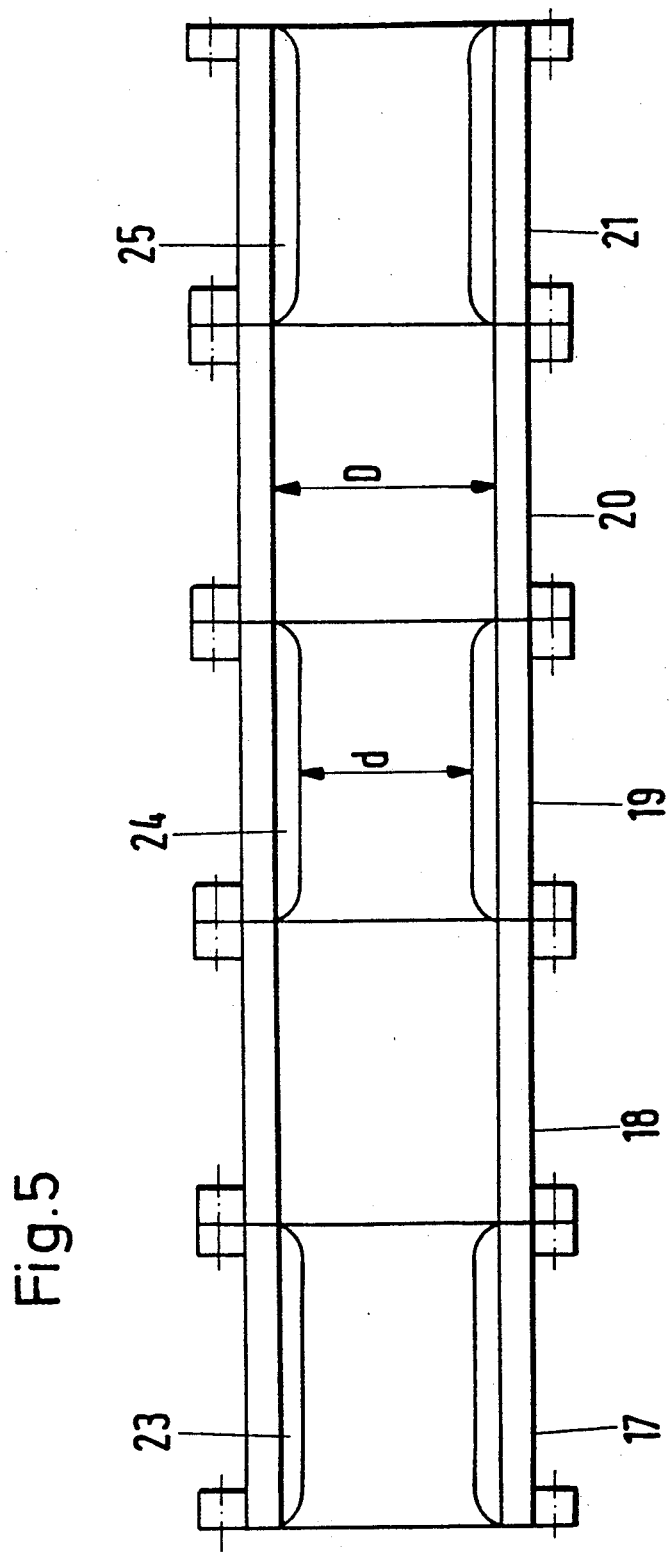
FIG. 5 shows a schematic sectional view of a further embodiment of a housing in accordance with the present invention in which the housing is formed from a plurality of sections, every alternate section being provided with a sleeve member.

In the embodiment of the invention shown in FIG. 5, the housing is formed from a plurality of individual barrel portions 17, 18, 19, 20 and 21. Sleeves 23, 24 and 25 are inserted into every alternate housing portion, that is to say, the portions 17, 19 and 21. The arrangement of this embodiment also ensures that the corrosion and wear remain substantially restricted to the sleeves.

In those embodiments where an insert member is provided in addition to the sleeves, it is, of course, important that the sleeves are formed from a material which has higher corrosion-resistant and wear-resistant properties than the material from which the insert member is formed. Both the sleeve members and the insert member may be made from a bimetallic material. The sleeves may be formed from hardened chrome steel.

In all of the above-described embodiments the costs of producing corrosion- and wear-resistant sleeves are reduced by up to 70% compared with the provision of a wear-resistant insert which is disposed along the entire length of the barrel. It is, as mentioned hereinbefore, very labor intensive and expensive to produce wear-resistant linings for the entire barrel by, for example, the HIP (High-Isostatic-Pressure) method. Inserts formed from hardened chrome steel are also very cost intensive. However, the losses in conveyance and/or pressure as a result of the increased distances between the crests of the screw flights and the internal wall of the barrel in those locations where no support sleeve is provided are only slight and, in consequence, can be ignored.

We claim:

1. A wear-resistant housing for a screw extruder comprising a barrel having a longitudinal axis and an internal surface spaced from said longitudinal axis to define at least one bore extending longitudinally through said barrel, said barrel further including opposed first and second end regions, a sleeve member disposed in each of said first and second end regions, each said sleeve member having a longitudinal axis which coincides with the longitudinal axis of said barrel and having an internal surface which defines at least one bore through said sleeve member, said bore in said barrel member and said bores in said sleeve members having predetermined diameters and jointly defining a continuous bore through said housing, an extruder screw mounted to rotate in said continuous bore and having an external diameter less than the diameter of said bores in said barrel member and said sleeve members, and wherein said bores defined in said sleeve members each have a diameter smaller than the diameter of said bore defined in said barrel, whereby greater friction and consequently greater wear occurs in the regions of said sleeve members compared to wear on the bore of said barrel.

2. A wear-resistant housing as recited in claim 1, additionally including at least one insert member disposed within said barrel intermediate said sleeve members, said insert member having a longitudinal axis and an internal surface surrounding but spaced from said axis to define at least one bore through said insert member, said bores of said sleeve member and said insert member having predetermined diameters and defining a continuous bore for receiving said extruder screw, said bore of said insert member having a diameter in excess of said diameter of said bores of said sleeve members, and wherein each of said sleeve members is formed from a material having a higher wear-resistance and a higher corrosion-resistance than the material forming said insert member.

3. A wear-resistant housing as recited in claim 1, wherein said barrel comprises an odd-numbered plurality of barrel portions each of which has a longitudinal axis and an internal surface surrounding but spaced from said longitudinal axis to define an internal bore, means interconnecting and aligning said barrel portions such that said longitudinal axes of said portions are coincident with one another to form a barrel having opposed first and second end portions, and wherein at least one further sleeve member, identical to said sleeve members inserted into each of said end regions, is inserted into every alternate barrel portion.

4. A wear-resistant housing as recited in claim 1, wherein said internal surfaces of said barrel and said sleeve members define a single bore having a circular cross-section, said bores jointly defining a passageway for receiving the screw of a single-screw extruder.

5. A wear-resistant housing as recited in claim 1, wherein said internal surfaces of said barrel and said sleeve members define overlapping twin bores, said twin bores having longitudinal axes extending parallel to one another.

6. A wear-resistant housing as recited in claim 1, wherein said bore in each said sleeve member has a diameter which is less than the diameter of said bore in said barrel portion by an amount lying in the range of from about 0.1 mm to about 10 mm.

7. A wear-resistant housing as recited in claim 6, wherein the difference in said diameters of said bore in said barrel and said bores in said sleeve members lies in the range of from about 0.2 to 6 mm.

8. A wear-resistant housing as recited in claim 6 wherein said difference in said diameters is 3 mm.

9. A wear-resistant housing as recited in claim 1, wherein each of said sleeve members has an axial length which lies in the range of from 0.01 to 2 times the diameter of said extruder screw mounted for rotation in said housing.

10. A wear-resistant housing as recited in claim 8, wherein both of said sleeve members and said insert member are formed from a bimetallic material.

11. A wear-resistant housing as recited in claim 2, wherein said sleeve members are formed from hardened chrome steel.

12. A wear-resistant housing as recited in claim 1, additionally comprising means for retaining said sleeve members in position in said barrel after insertion into said end regions.

13. A wear-resistant housing as recited in claim 12, wherein said means for retaining comprises a press-fit relationship between the end regions of said barrel and said sleeve members.

14. A wear-resistant housing as recited in claim 12, wherein said retaining means comprises form-fitting means in the form of a dovetail joint.

15. A wear-resistant housing as recited in claim 12, wherein said retaining means comprises an adhesive.

16. A wear-resistant housing as recited in claim 12, wherein said retaining means comprises screw-threaded connection members.

17. A wear-resistant housing as recited in claim 5, wherein each said sleeve member is integrally formed.

18. A wear-resistant housing as recited in claim 5, wherein said overlapping twin bores have a plane of intersection, and wherein each said sleeve members comprises two half-shells welded together along said plane of intersection of said twin bores.

* * * * *